Nov. 9, 1954  F. WHITWORTH ET AL  2,693,701
GAS METER DIAPHRAGM
Filed Aug. 25, 1949
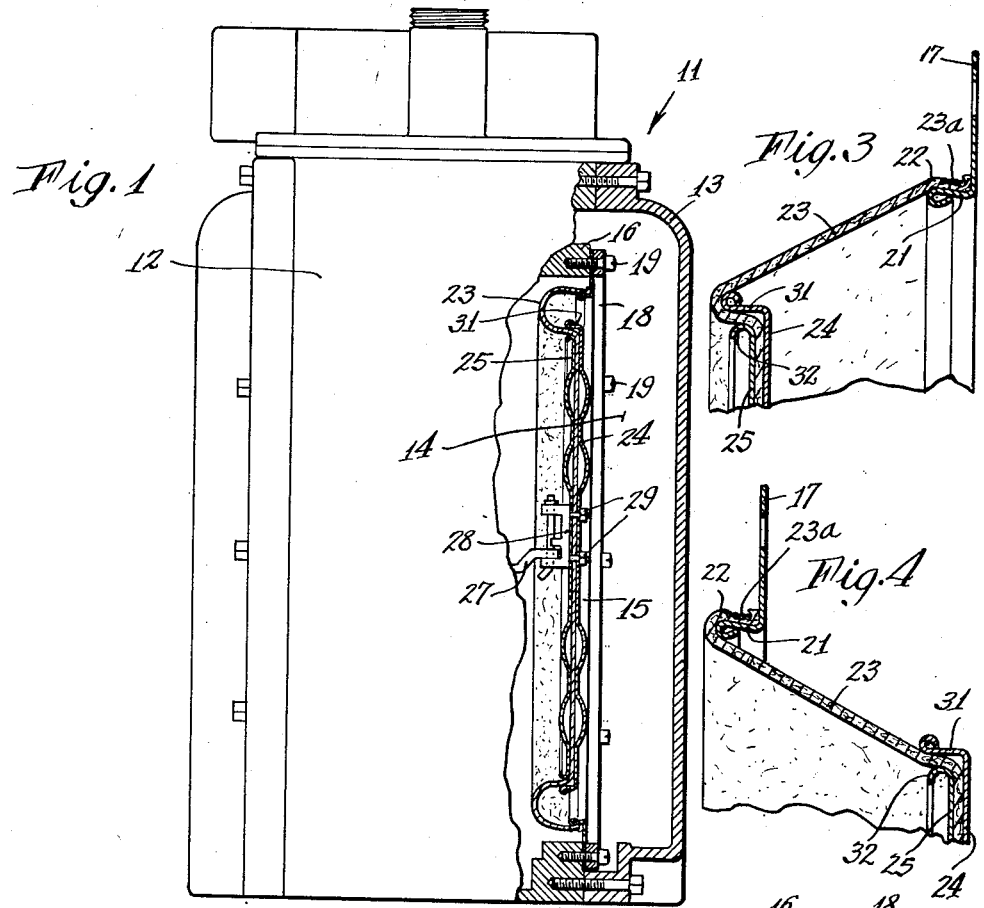
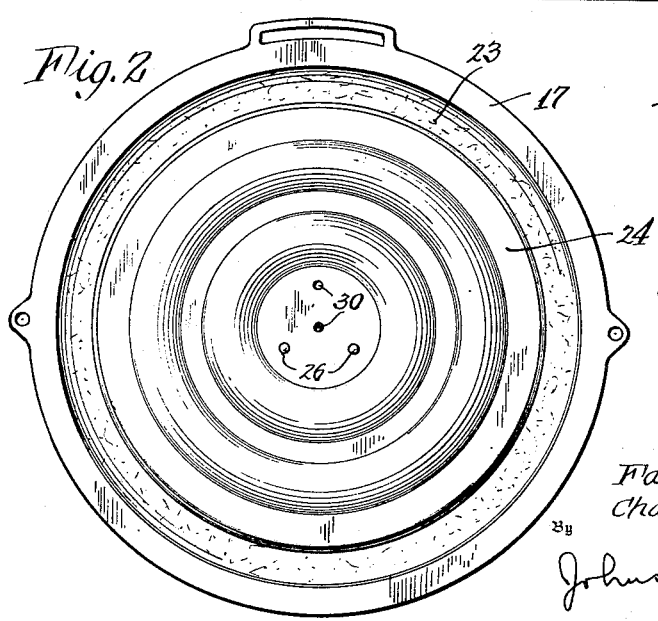
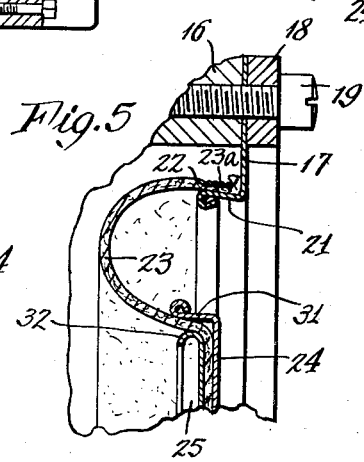
Inventors
Fairchild Whitworth
Charles W. Stewart
By Johnson and Kline
Attorneys United States Patent Office 2,693,701
Patented Nov. 9, 1954

2,693,701

GAS METER DIAPHRAGM

Fairchild Whitworth and Charles W. Stewart, Fairfield, Conn., assignors to Sprague Meter Company, Bridgeport, Conn., a corporation of Connecticut Application August 25, 1949, Serial No. 112,314

2 Claims. (Cl. 73—278)

This invention relates to gas meters and particularly to the reciprocating diaphragms employed in such meters to operate the meter dials. Such a diaphragm is usually supported for reciprocation in a suitable chamber and is connected to a control valve, which causes the gas flow to actuate the diaphragm alternately in opposite directions, and to the meter dials which are actuated by such reciprocation to record the volume of flow through the meter. The diaphragm usually comprises a flexible material, for example leather, and a center plate member to which the dial and valve mechanisms are connected. In a well known construction, the outer edge of the flexible material is secured to an axial flange formed on a surrounding ring member. A waxed cord or other type of strand is wrapped around the edge of the material and the outer face of the axial flange to secure the material to the flange and support the plate member for reciprocation.

Although this method of supporting the diaphragm has many advantages, it has been found to introduce inaccuracy into the meter operation due to the fact that it causes the diaphragm to move past the plane of the outer ring further in one direction than in the other, although for accurate operation in such meters the mid point of the path of reciprocation of the diaphragm should lie in such plane. This condition of inaccuracy is accentuated when the center plate is large enough to leave only a relatively small annular space between it and the surrounding flanged ring with a correspondingly small area of flexible material connecting the plate to the ring member.

An object of this invention is to provide a gas meter diaphragm for use with a supporting flanged ring of such construction and arrangement as to insure a reciprocatory diaphragm movement which is substantially symmetrical with respect to the plane of the supporting ring member.

A feature of the invention is the provision of a flanged center plate, the flange of which extends in the same axial direction for substantially the same distance as the flange on the ring member to which the edge of the flexible material is secured. The material is held in contact with such flange so that the effect is to displace the fulcrum line in the flexible material at the center plate in the same direction and to the same extent as the fulcrum line is displaced at the ring member by the ring flange. As a result, it will be found that the reciprocation of the diaphragm is symmetrical relative to the plane of the ring member. That is to say, the path of reciprocation will extend a substantially equal distance on each side of such plane, resulting in accurate meter operation. Hence, this type of support for a diaphragm can be employed in standard gas meters without rendering them inaccurate.

A further feature is the provision of a gas meter diaphragm having plate and disk members arranged to be secured together and to the flexible diaphragm material in a manner permitting quick and accurate assembly.

Other features and advantages will hereinafter appear.

In the accompanying drawings:

Figure 1 is a view of a gas meter in elevation, with part in section illustrating a diaphragm constructed in accordance with one embodiment of the invention.

Fig. 2 is a view in elevation of the diaphragm illustrated in Fig. 1.

Figs. 3 and 4 are partial sectional views illustrating the symmetrical reciprocation of a diaphragm constructed in accordance with the present invention relative to the plane of the supporting ring member, and Fig. 5 is a partial sectional view somewhat similar to Figs. 3 and 4, showing the outer ring support in place and the diaphragm proper positioned within the diaphragm chamber of the meter.

The illustrated embodiment of the invention is shown in connection with a gas meter 11 including the usual casing 12 and cover 13 enclosing a diaphragm chamber 14 in which a diaphragm 15 is supported for reciprocation by the gas flow through the meter. As illustrated, the diaphragm is supported on an annular supporting face 16. An outer diaphragm ring member 17 is clamped against the face 16 by a clamping ring 18 secured in place by the cap bolts 19, or the like. The inner edge of the ring member 17 is formed with an axially directed flange 21. The outer edge 22 of a flexible diaphragm member 23, usually formed of such flexible material as leather, or the like, is secured to the outer face of the flange 21 by a waxed binding cord 23a or the like, which is wrapped around the edge of the flexible material to bind it securely to the flange.

The flexible diaphragm material 23 extends across the diaphragm chamber 14 and includes a sheet metal center plate 24 which forms one face of the diaphragm 15 and an inner sheet metal disk 25 on the opposite side of the flexible material.

The diaphragm assembly consisting of the outer plate 24, the flexible material 23, and the inner disk 25 is secured together in accurate alignment by rivets 26 extending through aligned holes in the three elements. This arrangement facilitates the assembly of the different parts of the diaphragm member and permits the use of a jig or the like for the assembling operation, as the punched holes in the two plates and in the flexible material are merely brought into alignment and the rivets applied. The diaphragm 15 is connected to the valve and linkage mechanisms of the meter by a link 27 bolted to a connecting bracket 28 mounted on the diaphragm by bolts 29 extending through bolt holes 30 in the plate 24, disk 25 and flexible mtaerial 23, see Fig. 1.

In order to assure the reciprocation of the diaphragm being symmetrical relatively to the ring member 17, that is along an axial path extending a substantially equal distance on each side of the plane of the ring member 17, the present invention provides means for offsetting the fulcrum line of the flexible material from the plane of the plate a distance equal to the offset of the fulcrum line from the plane of the ring member by the flange 21 and in the same direction. As illustrated, the outer diaphragm plate 24 is provided with a peripheral flange 31 extending in the same axial direction and for substantially the same axial distance as the flange 21 on the ring member 17. At the same time, the inner diaphragm disk 25 is of such size that the outer edge 32 thereof, which is shown as curved, holds the flexible material against the inner face of the diaphragm flange 31.

As best shown in Figs. 3 and 4, this arrangement of flanges provides a construction which produces a symmetrical reciprocation of the diaphragm 15 relative to the plane of the ring plate 17. In Fig. 3, the diaphragm is shown at the extreme left of its movement, while in Fig. 4 it is shown at the extreme right. As shown in the two views, the plate 24 moves past the plane of the ring 17 an equal distance in each direction. As a result of this arrangement the operation of the meter dials is kept accurate and the inaccuracy heretofore produced by the unbalanced movement of a diaphragm supported on a flanged ring plate is eliminated.

In operation, the gas flow through the meter is directed by usual valve mechanism (not shown) against first one side of the diaphragm 15 and then the other. The reciprocations of the diaphragm cause the valve mechanism to operate and simultaneously cause operation of the meter dials through the link 27.

It will be apparent that the invention can be variously modified and adapted and that portions of the improvements can be used without others.

We claim:

1. A diaphragm for gas meters including an outer substantially flat supporting ring member having an axially extending cylindrical flange around the inner edge thereof provided with a fulcrum edge spaced a predetermined distance from the plane of the ring, a reciprocable center plate member adapted to reciprocate along a path extending on opposite sides of the plane of said ring member, a flexible disk member connected to said center plate member and having an outer edge overlying and secured to the flange of said ring member whereby the fulcrum line of said material adjacent said ring member is offset from the plane of said ring member a determinate extent, and means for offsetting the fulcrum line of said material adjacent said center plate a distance substantially equal to said first offset and in the same direction, including a peripheral cylindrical flange on said center plate extending axially a distance substantially equal to the axial extent of said ring flange and in the same direction, and means lying below the edge of said flange and holding said flexible material in engagement with the inner side of said plate flange, comprising a disk secured to said plate member with the edge of said disk adjacent the inner face of the disk flange and holding said flexible material in engamenet with said inner face adjacent the edge of the flange, whereby the path of reciprocation of said center plate member is substantially symmetrical with relation to the plane of said ring member.

2. A gas meter diaphragm including a plate member having a cylindrical peripheral flange projecting from the plane of the plate and axially of the plate; a layer of flexible material of greater diameter than said plate member overlying said plate member and said flange and extending outwardly past said flange; a material holding disk secured to said plate member and said intervening flexible material, said disk lying within the flange on the plate and being of such diameter as to press said material into contact with the inner face of said flange adjacent the edge thereof and said plate, disk and flexible material having a plurality of spaced perforations which are aligned when said parts are in predetermined relative position for assembly; and fastening means extending through only some of said aligned perforations to secure said parts together with other of said perforations in alignment and adapted to receive the fastening means of the meter linkage mechanism.

References Cited in the file of this patent

UNITED STATES PATENTS

| Number | Name | Date |
| --- | --- | --- |
| 1,149,716 | Britton | Aug. 10, 1915 |
| 1,414,835 | Spohrer | May 2, 1922 |
| 1,788,754 | Waddell | Jan. 13, 1931 |
| 1,982,966 | Schweisthal | Dec. 4, 1934 |
| 2,514,388 | Gilmore | July 11, 1950 |
| 2,544,665 | Gilmore | Mar. 13, 1951 |

FOREIGN PATENTS

| Number | Country | Date |
| --- | --- | --- |
| 19,731 | France | Mar. 13, 1915 |
| | (1st addition to No. 426,677) | |
| 136,226 | Switzerland | Jan. 2, 1930 |